Aug. 7, 1956    J. D. PENDER    2,757,476
FISHING FLY
Filed Aug. 22, 1951    2 Sheets-Sheet 1

Inventor
JOSEPH D. PENDER
WHITEHEAD & VOGL
Per Earle Whitehead
Attorneys

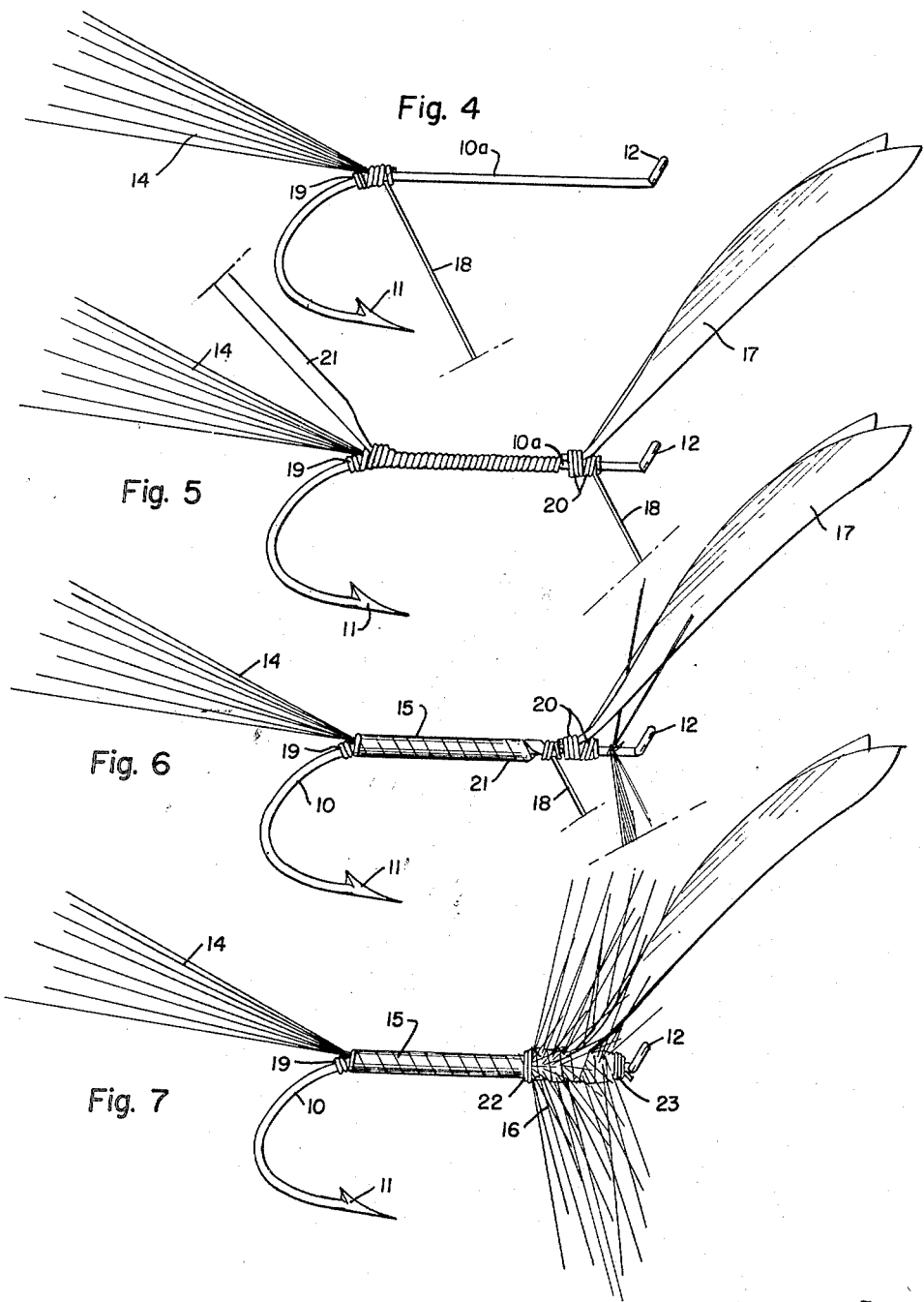

United States Patent Office 2,757,476
Patented Aug. 7, 1956

2,757,476

FISHING FLY

Joseph D. Pender, Denver, Colo., assignor of one-half to John Eble, Denver, Colo.

Application August 22, 1951, Serial No. 243,002

1 Claim. (Cl. 43—42.25)

This invention relates to fishing lures and more particularly to dry flies commonly used for catching trout, the primary object being to provide a new and improved dry fly which resembles insects of the order Ephemeridae. A representative species of such insects is the common May fly, and the term May fly will be used hereafter to designate such insects.

Other objects of this invention are to provide: (a) a dry fly which, while floating, resembles the May fly, with its wings standing upright, (b) a dry fly so constructed that it will float with its wings standing upright and so balanced that it will normally fall and alight upon the water in such upright position, (c) a dry fly adapted by construction to light upon the water in an upright position with the barb of the hook projecting into the water beneath, (d) a new and improved method of tying a dry fly which will alight and float on the water in accordance with the above stated objects, and (e) a dry fly having the characteristics above described which may be easily tied with conventional materials and equipment, and cost no more than conventional dry flies.

With these, and other objects in view, all of which more fully hereinafter appear, my invention comprises certain new and novel constructions, combinations and arrangements of the elements constituting a dry fly, and also consists of new and novel steps in the procedures of tying dry flies, all as hereinafter described, and as defined in the appended claim, and illustrated, in preferred embodiment, in the accompanying drawing, in which:

Figures 4, 5, 6 and 7 are side elevation views of my improved dry fly depicting steps in the tying of the fly upon a hook in accordance with my invention, Figure 4 illustrating an initial step, Figures 5 and 6 illustrating intermediate steps, and Figure 7 the completed fly.

The art of fishing includes the preparation and use of artificial lures which are generally made to resemble, insofar as possible, a natural food of the fish. One popular lure for catching trout and other game fishes is the dry fly, and considerable effort has been expended in perfecting the art of dry fly fishing. In providing suitable lures for this purpose, it has been attempted to duplicate the forms of different insects. One common type of insect is represented by the Ephemeridae family, commonly called "May fly." There are a number of species of these flies, and they all commence their lives as aquatic larvae, leaving the water as winged adults when they mature, to lay their eggs upon the water and die. The aquatic existence makes them a natural fish food and when large numbers of such flies are upon the water surface of a lake or stream, the fish will feed on these flies and ignore other types of food, as well as fishermen's lures.

The delicate form of the May fly has been exceedingly difficult to imitate or duplicate in the construction of a lure, and it has been considered practically impossible to position a lure upon the water surface in the manner in which May flies position themselves, with their legs and tail often touching the water surface and with their wings standing up. Competent dry fly fishermen recognize that at certain seasons it would be desirable to have a lure or artificial fly which will resemble a May fly standing upon the water in the usual lifelike manner.

While the need for such improved dry fly construction exists, it has never heretofore been met, and with such problem in view the present invention was conceived and developed, and comprises, in essence, a dry fly tied with the conventional component elements so arranged as to create a natural balance between the forward, or eye, and the hook or barb ends, which sets the fly upright on the water with the lower portion of the hackle holding the forward end of the fly upward, with the wings standing up in the same manner as assumed by the natural insect, and with the tail sprigs resting upon, and the barb depending into, the water. The arrangement of the elements further conditions the fly to alight upon the water in such upright position upon the completion of a cast. The invention further consists of a new and improved method for tying dry flies of the character hereinafter described.

Figure 1:
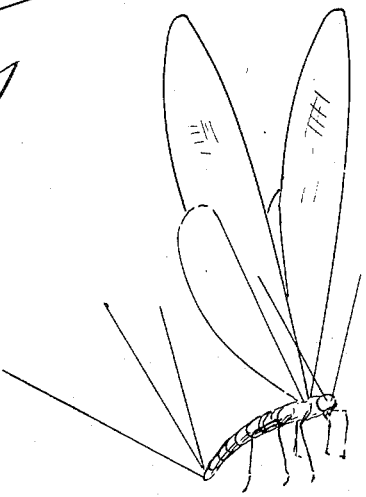
Figure 1 is a sketch representing a typical May fly as it would appear while poised upon the water surface.

From the sketch shown at Figure 1, it is seen that a typical May fly will position itself above the water with the body tilted downwardly toward the rear, the fly standing upon the surface of the water. While flying the abdomen is usually inclined upwardly. The fly has a slender body and the wings are transparent and delicately constructed.

Figure 2:
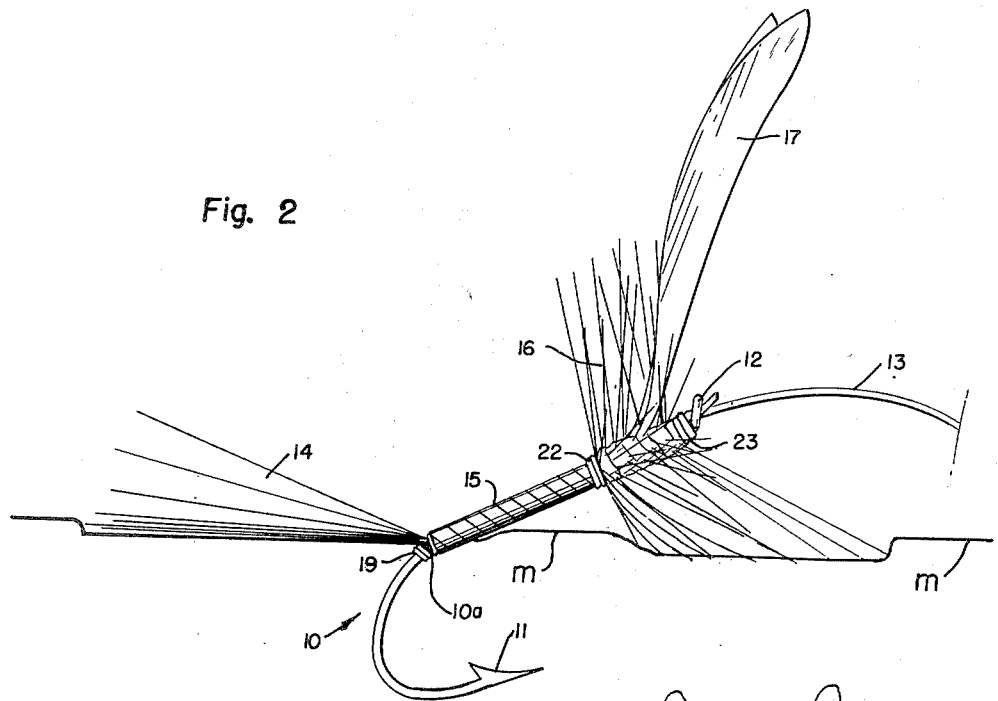
Figure 2 is a side elevation of my improved dry fly as positioned upon the water surface to imitate the May fly, the showing being on an enlarged scale.
Figure 3:
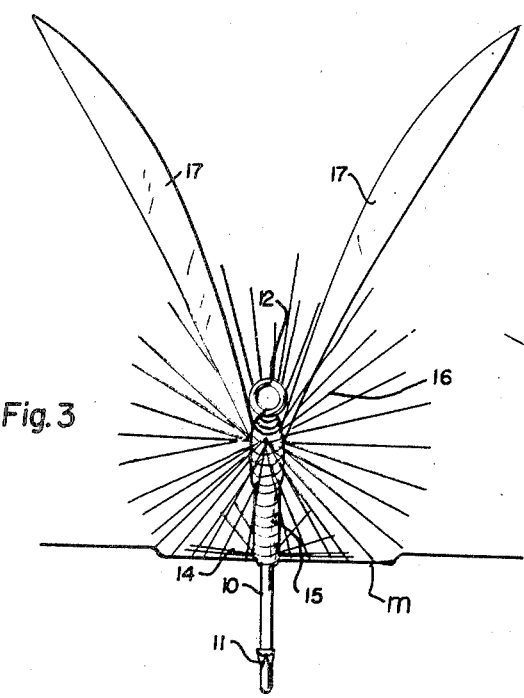
Figure 3 is a front elevation of the dry fly shown at Fig. 2.

The lure illustrated at Figs. 2 and 3 is designed to imitate the May fly illustrated at Fig. 1. This lure is formed from the same elements used in tying conventional dry flies, but it is the arrangement of the elements which provides the improved construction.

The body of the fly is tied upon the shank 10a of a fishing hook 10, with the barb 11 of the hook at the tail of the fly, and the eye 12 at the head. The eye 12 is adapted to engage a leader 13 of a fishing line. A description of the components of the artificial fly, commencing at the rearward end of the fly, includes tail sprigs 14, a quill shaft 15 representing the abdomen of the insect, and the hackle portion 16, generally a group of radial hairs or feather barbs extending from the body of the fly to represent the legs, antenna and hairy portions of the insect. A pair of wings 17 are also attached to the fly in the hackle portion.

The essential difference in the present construction from conventional construction lies in the manner in which the tail sprigs 14 are directed upwardly from the shank of the hook, the forward tilt of the hackles 16 to clear the hackle hairs from the barb 11 of the hook, and a distinct forward tilt of the wings. The fly will float upon the water surface without breaking through. However, the barb 11 of the hook will sink downwardly to the vicinity of the point where the tail sprigs 14 are attached to the shank of the hook and this will cause the shank, which depicts the body of an insect, to assume an upwardly inclined position, as clearly illustrated at Fig. 2. It is to be noted that this inclined position of the body is similar to the natural tilted position assumed by the insect, as shown at Fig. 1, with the wings standing upright in both instances.

My construction not only causes the fly to float in desired position, but the forward tilted wings act as an air drag to hold back the forward end of the fly while dropping and causes the fly to assume the desired position when dropping onto the water as upon the completion of a cast.

To produce a fly which will drop onto and float on the water in the desired manner, as above described, certain steps are necessary which are new and different from the conventional tying steps, and Figs. 4 through 7 illustrate these steps. The first step is to attach a thread 18 to the shank 10a of the hook 10, at the rear end of the straight shank. The tail sprig 14 is next attached as illustrated at Fig. 4, by wrapping the thread around a tuft of hair or feather barbs laid upon the hook shank in the desired position. The thread is not only wrapped over the tail sprig hairs to connect them to the hook, but also one or more wraps are taken around the hook below the tail sprig to provide a support 19 to incline the sprig upwardly from the shank axis.

Having completed the binding of the tail by thread 18, the thread is held and one end of a quill 21 (later described) is tied to the shank adjacent the tail binding and the thread is then wound about the shank spirally toward the front or eye end. The thread is then wrapped around a pair of feather clippings or similar material used in the formation of such wings, with loops 20 in front of, behind and between the points of connection of the wings with the shank and bearing against the wings, front and rear, in such a manner as to hold them at a distinct forward tilt relative to the axis of the shank and to separate the wings at opposed inclinations.

Following the connection of the wings, the shank 10a is covered by wrapping a quill 21, or similar ribbon-like fiber, about it, and this operation forms a construction of the quill shaft 15 or abdomen of the fly. The wrapping of the quill commences at the tail end of the fly, the end of the ribbon-like quill 21 having been secured to the shank by thread 18 when the tail binding by thread 18 was completed. Upon wrapping the quill until it is at the forward end of the shank, a tie is made at or near the wings with the thread 18 to hold the quill in position.

The next step is to wrap the hackle 16 about the forward end of the shank. The hackle is ordinarily a thin feather having barbs which separate as it is wound around the shank to provide the characteristic hairy section at the head and thorax of the fly. In wrapping this hackle about the shank two steps are taken which are different from a conventional procedure. First, the major portion of the hackle is wrapped behind the wings and only a small portion of the hackle is wrapped around the shank forwardly of the wings. Second, the hackle is wrapped in such a manner that the radial hairs will tilt forward toward the head of the fly or eye 12 of the hook.

A sufficient number of wraps is made behind the wings to completely close the gap between the wings and the quill 15. The thread is then wrapped around the body between the hackle and quill to form an abutment 22, which helps hold the hackle barbs at the desired forward inclination. The final step is to bring the thread to the forward end of the shank adjacent the eye and there tie a knot 23 of a character which will secure the thread when cut.

To reiterate, the essential features of this invention include the lifting of the tail sprigs to an inclination upwardly of the axis of the hook shank, tilting the wings forwardly to provide for improved balancing so as to cause the fly to assume the desired position as it alights upon the water and to float in such position and the substantial spacing of the hackle hairs away from the barb, preferably by inclining them forwardly toward the hook eye.

Alternatives and equivalents will occur, to those skilled in the art, which are within the spirit and scope of my invention, and hence, it is my desire that I be limited in my protection, not to the details shown and described, but only by the proper scope of the appended claim.

I claim:

A dry fly tied upon a hook having an eye, a shank and barb-carrying band, simulating the form of a May fly and being adapted to alight and float upon the water in a manner and position simulating that of a May fly when alighting and floating upon the water with the end of its tail touching the water surface and with its body being inclined upwardly therefrom and its head above the water surface, and comprising a body portion formed upon the shank with the head at the hook eye and the end of the tail at the hook bend and with the hook bend extending underneath the body, water resistant tail sprigs projecting rearwardly from the body and at an inclination upwardly from the body axis whereby to lie flatly upon the water surface with the body inclined upwardly from its tail in the manner of a May fly and with the hook being submerbed, a water resistant hackle about the front portion of the body with the hairs thereon extending outwardly and radially from the body and at a forward inclination from a position normal to the shank axis and being thereby adapted to lie upon the water surface forwardly of the body to support the front of the body above the water surface, wings at the hackle portion projecting above the body, at a forward inclination from a position normal to the shank axis to a substantially vertical position when the body is being supported above the water surface at an inclination by the tail sprigs and hackle, said wings being further inclined outwardly away from each other whereby to brake and balance the fly in falling and cause it to alight upright upon the water surface at said inclination.

References Cited in the file of this patent

UNITED STATES PATENTS

| | | |
|---|---|---|
| 361,965 | Mills | Apr. 26, 1887 |
| 2,034,832 | Raycraft | Mar. 24, 1936 |
| 2,114,342 | Gardner | Apr. 19, 1938 |
| 2,148,799 | Bilinski | Feb. 28, 1939 |
| 2,384,993 | Goddard et al. | Sept. 18, 1945 |
| 2,544,265 | Kelly et al. | Mar. 6, 1951 |

FOREIGN PATENTS

| | | |
|---|---|---|
| 379,343 | Great Britain | Aug. 29, 1932 |
| 438,819 | Great Britain | Nov. 25, 1935 |

OTHER REFERENCES

Pennsylvania Angler, January 1939, pp. 2, 3 and 7.